April 10, 1956
C. H. BORNER ET AL
2,740,973
APPARATUS FOR MAKING LOCK SCREWS HAVING
FRICTION LOCKING PLUGS INSERTED THEREIN
Filed Oct. 17, 1952
3 Sheets-Sheet 1
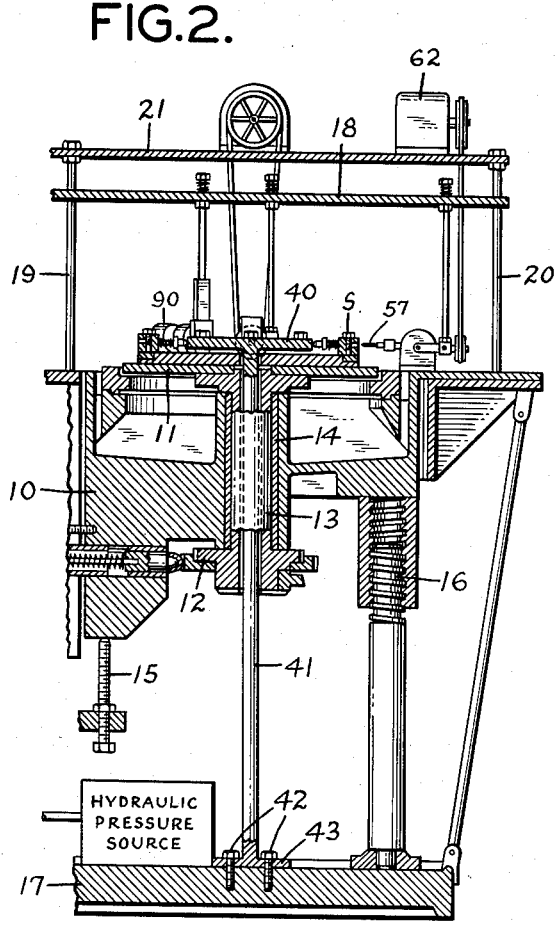
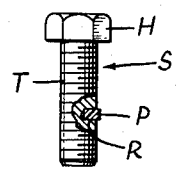
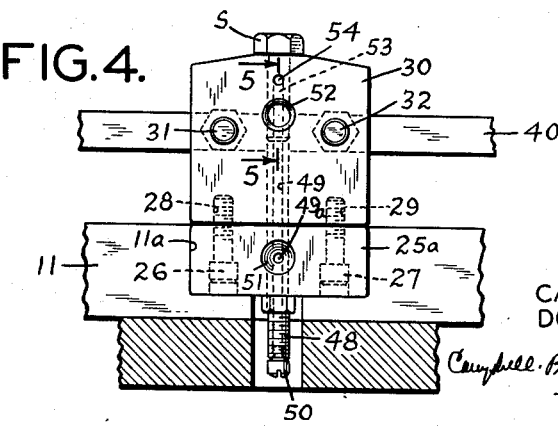
INVENTORS.
CARL H. BORNER
DOMINICO R. TARALLO
BY
THEIR ATTORNEYS.

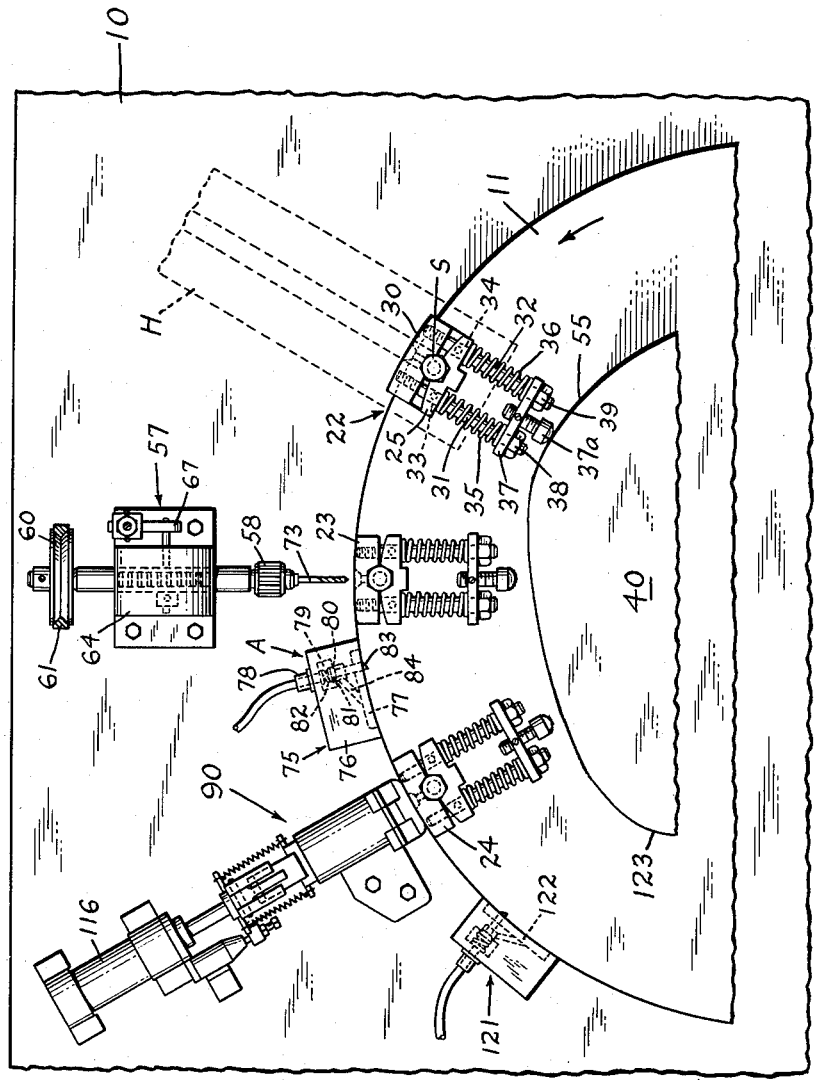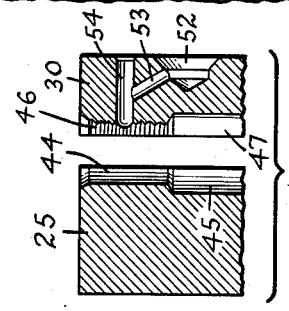

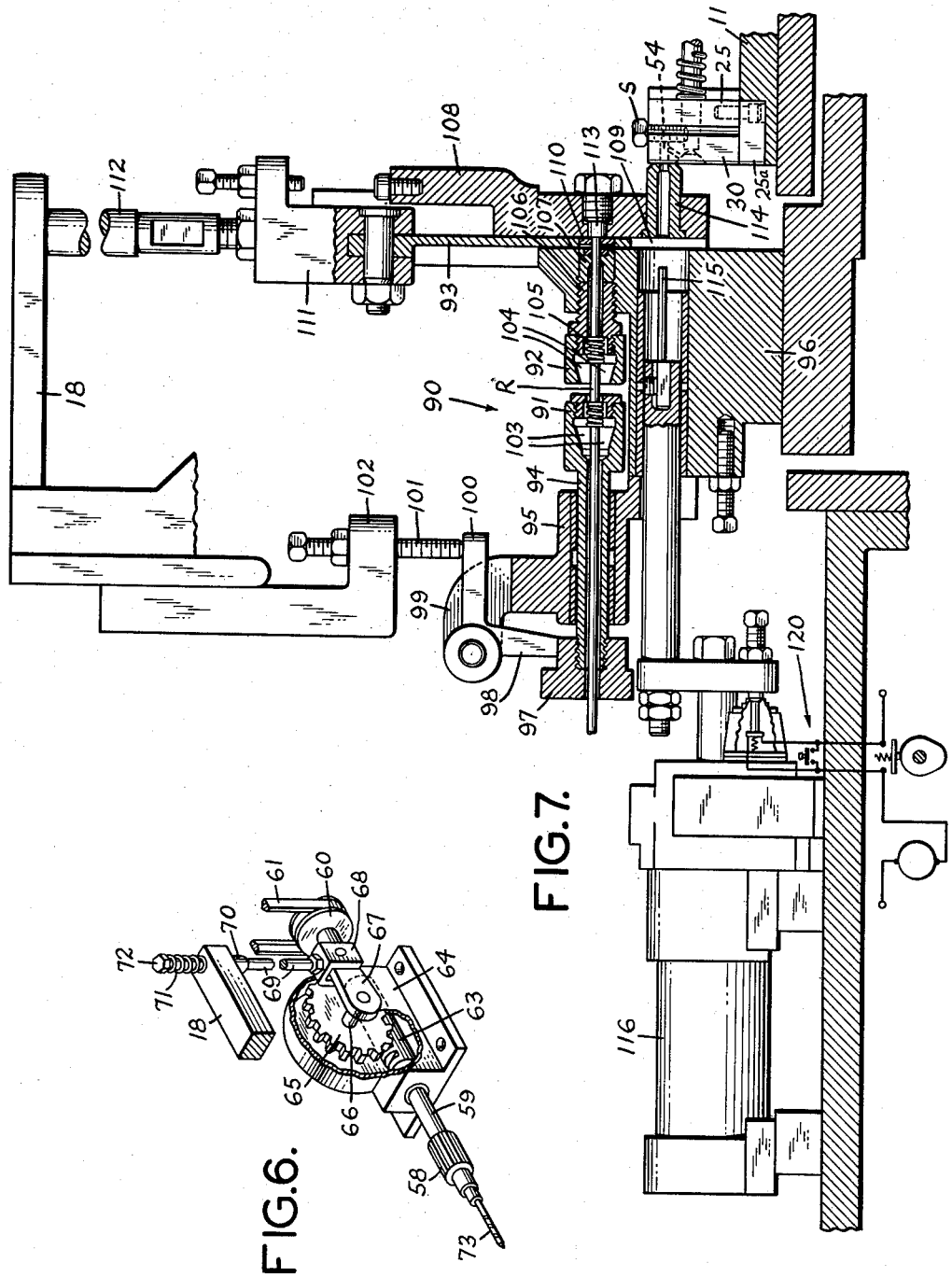

United States Patent Office 2,740,973
Patented Apr. 10, 1956

2,740,973

APPARATUS FOR MAKING LOCK SCREWS HAVING FRICTION LOCKING PLUGS INSERTED THEREIN

Carl H. Borner, Dumont, N. J., and Dominico R. Tarallo, Towson, Md., assignors to The Nylok Corporation, New York, N. Y., a corporation of Delaware Application October 17, 1952, Serial No. 315,244

4 Claims. (Cl. 10—2)

This invention relates to machines for making self-locking screws, bolts and the like, of the type having a locking plug of rubber, nylon or other resilient synthetic or natural material for restraining the screw or the like against rotation after it has been received in a complementally threaded hole, nut or the like. More particularly, the invention relates to an automatic machine tool for drilling recesses in screws, bolts and the like for cutting and inserting the resilient plugs into the recesses.

The invention further relates to improvements in fixtures for holding the screws, bolts and the like, during drilling and plug inserting operations.

Heretofore, the operations of drilling recesses in screws, bolts and the like, hereinafter referred to, generically, as screws, and inserting the resilient plugs therein have been manual operations which have created considerable difficulty because of the fact that many screws are relatively small and difficulty has been encountered in holding them fixedly during the drilling and inserting of the resilient plugs. Moreover, because of the lack of high speed automatic machinery the production rate is much lower than might be desired and the cost of production commensurately increased.

Finally, and probably most important of all, the drilling of a hole in an externally threaded part has always presented difficulties because of burrs which are formed around the hole and which are very difficult to remove even by chasing.

In accordance with the present invention, we have provided an automatic machine having a novel type of jig or fixture for receiving screws for holding them securely during the drilling and plug inserting operations and for cleaning out metal particles from the drilled holes prior to insertion of the plug thereunto and for ejecting the screws automatically after they have been finished. In addition, this new type of fixture permits the drilling of holes in externally threaded parts without the formation of burrs even after the drills are no longer sharp.

The new automatic machine is constructed and arranged to drill the recesses in the screws at accurately located zones and to accurately controlled depths and to cut and insert the resilient plugs quickly and precisely into the recesses. In this way, the machine provides a high rate of production with a minimum of damaged or rejected screws so that the screws can be produced economically and in the large quantities required industrially.

For a better understanding of the present invention, reference may be had to the accompanying drawings in which:

Fig. 1 is a view in elevation and partly in section of a screw produced by the machine embodying the present invention;

Fig. 2 is a view in vertical section taken through a portion of an automatic machine of the type embodying the present invention;

Fig. 3 is a plan view of a portion of the machine with parts broken away and partially in section to disclose details of the screw supporting fixtures and the cooperating tools;

Fig. 4 is a view in front elevation of a fixture of the type embodying the present invention for receiving and supporting a screw during drilling and plug inserting operations thereon;

Fig. 5 is a view in section taken on line 5—5 of Fig. 4 showing a portion of the supporting fixture with the jaws thereof separated for receiving a screw;

Fig. 6 is a perspective view of a typical radial drill for drilling of holes in the sides of screws, a portion of the casing of the drill and actuating mechanism therefor being broken away;

Fig. 7 is a view in partially vertical section and partially in elevation of a tool for cutting and inserting plugs of resilient material into the recesses drilled in the screws.

A typical machine tool embodying the present invention may be produced by suitably modifying a basic machine tool of known type. Such basic machine tool may be an automatic twin spindle tapping machine of the type manufactured by the Bodine Corporation of Bridgeport, Connecticut, and identified in their catalogue, Copyright 1945, as the No. 48 tapping machine.

Fig. 1 of the drawings discloses a typical form of screw S to be produced by the machine. The screw S has a head H of any desired kind such as hexagonal, socket or slotted and a threaded shank or stem T. A recess R is drilled radially of the stem and a plug P of resilient material is inserted in the recess with its outer end extending outwardly beyond the root lines and preferably the crests of the threads on the stem T. Other types of screws can also be produced with the new machine, for example, screws having diametrical recesses therethrough to receive a plug extending completely through the stem and having its opposite ends exposed on opposite sides of the stem.

An apparatus embodying the invention and used for producing such screws will now be described. Fig. 2 of the drawings shows only a portion of the Bodine tapping machine, inasmuch as this machine is well known and, moreover, is shown in copending application Serial No. 201,468, filed December 18, 1950, by Carl H. Borner and now abandoned. The Bodine tapping machine includes a base frame 10 on which is rotatably mounted a table 11 which may be driven by means of a suitable pawl and ratchet mechanism 12 for step-by-step rotation. The table is provided with a sleeve or quill portion 13 which connects it with the ratchet of the pawl and ratchet mechanism 12 and also supports the table for rotation in the bearing sleeve 14 mounted in the frame of the machine. The table 11 and the corresponding portion of the frame 10 of this machine may be adjusted vertically by means of an adjusting screw 15 and an adjustable screw threaded leg 16 mounted on the base 17 of the machine.

The machine includes a crosshead member 18 which is reciprocated vertically by means of a motor and suitable cams (not shown). The motor also drives the pawl and ratchet mechanism 12. The machine also includes the spacer rods 19 and 20 which support a motor platform 21 in spaced relation to the table 11. In operation, the table 11 is rotated step-by-step with dwell periods between its movements and during these dwell periods, the crosshead is reciprocated down and up with a substantial dwell at the top and bottom of its movement. The machine thus far described is conventional.

Referring now to Fig. 3, the table 11 is used to support a plurality of screw receiving fixtures 22, 23, 24 and so forth, which are mounted in angularly spaced relation around the edge of the table. All of the fixtures 22, 23 and 24 are alike and only one of them will be described herein. The fixture 22, as shown in Figs. 3, 4 and 5, may consist of a back plate member 25 which is secured to the top of the table by means of a pair of screws 26 and 27 extending upwardly from the bottom of the table and engaging in threaded openings 28 and 29 in the bottom of the plate 25. The back plate has an extension 25a which extends into a notch 11a in the edge of the table 11 and is substantially flush with the edge of the table. The fixture 22 also includes a front plate 30 which is of generally rectangular shape in front view as shown in Fig. 4. The front plate is movable relative to the back plate 25 in a radial direction and is supported for such movement by means of a pair of rods 31 and 32 which are slidably received in the openings 33 and 34 in the upper part of the back plate 25. The outer ends of the rods are screwed into internally threaded openings in the front plate 30.

The front plate 30 is normally biased toward the back plate by means of the coil springs 35 and 36 which encircle the rods 31 and 32, bear at one end against the back of the back plate and at their opposite ends against a cross plate 37 to which the inner ends of the rods 31 and 32 are secured by means of the nuts 38 and 39. In the retracted position of the front plate 30, it overlies the extension 25a and their outer surfaces are substantially flush with each other.

The front plate 30 of the fixture 22 may be moved radially outward with respect to the back plate by means of a cam plate 40 which is supported substantially centrally of the table 11 as shown in Figs. 2 and 3. The cam plate 40 has a stem 41 which extends down through the sleeve shaft 13 and is secured non-rotatably to the base 17 of the machine by means of the screws 42 extending through the flange 43 on the lower end of the stem 41. The cam plate may be adjusted angularly by providing slots in the base flange 43 allowing angular adjustment of the base flange relative to the base 17 of the machine. The cross plate 37 of the fixture 22 is provided with a cam follower 37a which bears against the edge of the cam plate 40.

As shown in Fig. 5, the back plate 25 of the fixture has a semi-cylindrical smooth recess in its outer face 44 to engage the back of the shank of a screw. The semi-cylindrical recess is joined at its lower end to a larger semi-cylindrical recess 45.

The front plate 30 has a partially threaded semi-cylindrical recess 46 confronting the semi-cylindrical recess 44 for engagement with the threads of a screw to be operated upon in the machine. The lower end of the recess 46 communicates with an enlarged semi-cylindrical recess 47.

The cavity defined by the recesses 45 and 47 when the front and back plates are in engagement, or substantially so, receives, as shown in Fig. 4, elongated stem member 48 which acts to admit compressed air between the front and back plates to eject a screw from the fixture, as will be described hereinafter, and to position a screw S endwise in the fixture. The stem member 48 may be adjusted endwise to admit the screw S a greater or lesser distance into the fixture. The stem member 48 is tubular and the passage 49 therein has its lower end closed by means of a screw plug 50. The stem member 48 is threaded through the extension 25a of the back plate and is held in coaxial relation to the recess 45. The upper end of the stem 48 is open and is disposed below the lower end of a screw S received in the fixture. The stem also has a radial bore 49a therein which is in alignment with an opening 51 drilled through the front of the extension 25a to admit air into the longitudinal bore 49.

Directly above the opening 51 is another opening 52 which communicates by means of a diagonal passage 53 with a radial bore 54 near the top of the front plate 30. The position of the radial bore 54 depends upon the position that the plug receiving recess is to be drilled into the screw S supported in the fixture.

The screws S may be introduced into the fixtures through a feed hopper and chute H, as shown in Fig. 3.

The fixture is opened to receive the screw by means of a lobe 55 on the cam 40 which displaces the front plate 30 radially out and away from the back plate 25.

As the table 11 steps to position for drilling of a hole in the screw, the follower 37a on the cross bar 37 rides off the lobe 55 of the cam and allows the springs to move the jaws 25 and 30 together, as illustrated by the positions of the front and back plates of the fixture 23 in Fig. 3. If the threads of the screw S do not mesh fully with the threaded portion 46 of the fixture, a slight twist of the screw S will cause it to mesh with the threads on the front plate 30 of the fixture. Inasmuch as the front plate is biased inwardly by springs rather than by positive mechanical means, damage to the threads of the screws is reduced to a minimum.

With the screw held firmly in the fixture, the recess for receiving the resilient insert is then drilled in the screw by means of a radial drill 57. The drill 57 is of conventional type and may include, as best shown in Figs. 3 and 6, a chuck 58 for receiving a drill, the chuck being mounted on a shaft 59 having a pulley 60 non-rotatably but slidably mounted thereon and driven by means of a belt 61 and a motor 62 mounted on the platform 21 as shown in Fig. 2. The shaft 59 is rotatably mounted in a rack sleeve 63 which is supported in a casing 64 mounted on the frame 10 of the machine. The rack sleeve 63 and the shaft 59 rotatable therein are advanced and retracted by means of a gear 65 mounted in the casing 64 and meshing with the rack 63. The shaft 66 which supports the gear 65 is extended outwardly through the casing and is provided with a lever 67 on its outer end. The lever 67 is pivotally received in a clevis 68 on the end of a rod 69 which extends up through the crosshead 18 and is provided with a collar 70 bearing against the under side of the crosshead 18. The rod or shaft 69 is loosely received in the crosshead and is biased upwardly by means of a spring 71 interposed between the crosshead 18 and an enlarged head 72 on the upper end of the shaft. The collar 70 is adjustable lengthwise of the shaft 69 to vary the stroke of the rod and the extent of inward and outward movement of the chuck 58 and the drill bit 73 therein.

The radial drill 57 is so positioned that the drill bit 73 will pass through the opening 54 in the front plate and will drill a recess into the shank of the screw to a predetermined depth during downward movement of the crosshead 18. During upward movement of the crosshead 18 the drill is retracted or withdrawn and thereafter the fixture is moved to the next stage of operation where the resilient plug is cut and inserted into the drilled recess. During the movement of the table 11 between the drilling stage and the plug cutting and inserting stage, the fixture moves past an air blast device 75 which blows the chips from the recess in the screw. The air blast device may consist of a casing or block 76 which slidably engages the edge of the table 11. The casing 76 has an elongated groove 77 cut in its face which overlies the opening 52 in the front plate during movement of the fixture past the device 75. Air is supplied to the groove 77 through an inlet coupling 78 and a valve chamber 79 having a valve seat 80 and a cooperating poppet valve 81 therein. The poppet valve is biased by means of spring 82 against the seat but can be displaced from the seat by means of the stem 83 which projects from the inside of the casing 76 and engages the front plate 30 about midway between the openings 51 and 52. When the poppet valve 81 is displaced from its seat, air can flow from the chamber 79 past the valve 81 and through an inclined passage 84 into the groove 77. The air blast thus is directed through the opening 52 and the inclined and radial passages 53 and 54 into the recess drilled in the screw S with the result that any chips remaining therein are blown out through the radial passage 54.

In the third position of the fixture and the screw S, the fixture 24 is in alignment with a plug cutting and inserting device 90 which is of a type disclosed and described in the Borner application Serial No. 201,468. Generally, the device as shown in Fig. 7, includes a pair of clutch elements 91 and 92 which act to grip a portion of a rod R of the resilient material such as nylon and feed it into a position where plugs or sections can be cut from the end of the rod by means of a vertically reciprocating knife or cut-off member 93. The chuck member 91 is of tubular form and has a stem 94 slidable in a bracket 95 on the frame 96 of the cutting and inserting device 90. The outer end of the stem 94 is provided with an enlargement 97 which is engaged by one arm 98 of a bell crank lever pivotally supported on an L-shaped bracket 99 extending upwardly from the sleeve 95. The bell crank has a horizontally extending arm 100 which is engaged by means of an adjusting screw 101 carried by a bracket 102 extending downwardly from and secured to the cross head 18 so that as the crosshead moves up and down, the bell crank 98 is oscillated and the chuck member 91 is reciprocated back and forth.

The chuck member 91 is provided with spring biased jaws 103 which grip the rod R during movement of the chuck to the right to advance it endwise but release the rod upon movement of the chuck member 91 to the left.

The chuck member 92 also has jaws 104 which are tapered and biased by a spring 105 to prevent movement of the rod to the left but allow it to be advanced by the chuck member 91 to the right.

The right-hand end of the rod extends through the sleeves 106 and 107 on an extension 108 of the machine into a vertical slot 109 in which the cut-off member 93 is reciprocated. The cut-off member consists of a steel plate having a hardened annular bushing 110 therein and is reciprocated by means of a yoke member 111 which is connected by means of a rod 112 to the crosshead 18. The extension 108 also includes a stop member 113 for limiting the advance of the rod R.

The dwell of the crosshead 18 enables the rod to be advanced into the annular cut-off plate 113 while the latter is stationary. During downward movement of the cut-off member 93, the end of the rod is sheared off and it is moved downwardly into alignment with a tubular nipple 114 at the lower end of the extension 108. The plug is then forced from the cut-off member through the nipple 114 and the opening 54 in the front plate 30 of the fixture into the recess drilled in the screw S by means of a punch 115 which is driven by a hydraulic cylinder or ram 116. The ram 116 is operated in timed relation to the remainder of the mechanism by a suitable control valve system operated by means of a cam or any other desired structure (not shown) on the main drive of the machine. A safety control circuit 120 is provided to prevent operation of the entire machine and damage thereto if the punch 115 should be jammed in the cut-off member 93, as described more particularly in the Borner application Serial No. 201,468.

After the plug has been inserted in the recess of the screw, the table 11 is moved to an ejecting station where the screw is blown out of the fixture by an air blast device 121 similar to the air blast device 75, described above. The air blast device 121 differs from the air blast device 75 in that the groove 122 therein is positioned to come into alignment with the hole 51 in the front of the extension 25a of the back plate. Thus, a blast of air is directed into the opening 50 along the axial bore 49 of the stem 48 and is directed thereby against the lower end of the screw S. Inasmuch as the follower 37a at this point is in engagement with a lobe 123 on the cam 40, the front plate 30 is moved away from the back plate thereby releasing the screw so that it can be blown from the fixture and received in a suitable hopper, not shown.

While the invention has been described with reference to the use of only a single radial drill and a single plug cutting and inserting device, it will be understood that duplicate sets of drills and other mechanisms may be provided in the machine to increase its capacity. The use of multiple drills, of course, requires modification of the timing of the machine and such timing can be accomplished in the manner described in the above-mentioned Borner application.

The above-described machine provides an accurate speedy means for drilling recesses in screws of various types and inserting resilient plugs therein and accomplishes these operations with a minimum of damage to the screws or threads thereon. The screws are held securely in the fixtures and all parts of the machine can be brought into an accurate, predetermined alignment with the screws because there can be no movement or slippage of the screws while held in the fixtures.

It will be understood that the apparatus is susceptible to considerable modification and that it need not be practiced with the Bodine type of dual spindle tapping machine but can be adapted to other types of machines of original or conventional construction. Therefore, the form of the invention described herein should be considered as illustrative and not as limiting the scope of the following claims.

I claim:

1. In a machine for making lock screws having a substantially horizontal rotatable table and means for rotating said table, the combination therewith of at least one fixture to receive a screw mounted on said table adjacent to its outer edge, said fixture comprising a back plate having a recess in its outer face and a front plate having a recess in its inner face, one of said recesses having threads therein complemental to the threads on said screw, means supporting said front and back plates for relative movement toward and away from each other and substantially radially of said table, resilient means normally urging said front and back plates toward each other, said front plate having a radial opening therethrough intersecting the recess therein, and an inclined passage intersecting said radial opening to introduce air under pressure into said radial opening, a first passage in said back plate and extending axially of and communicating with the lower end of the recess therein, and a second passage in said back plate to introduce air under pressure into said first passage.

2. The machine set forth in claim 1 comprising drilling means adjacent to said fixture, means to move said drilling means toward and away from said fixture, said drilling means being in alignment with said radial opening in said front plate in one position of said table to enter said radial opening and drill a recess at least partially through said screw.

3. The machine set forth in claim 1 comprising means spaced angularly apart around said table for introducing air successively into said inclined passage and said second passage in different positions of said table.

4. The machine set forth in claim 1 comprising radially movable drill means including a drill bit adjacent the outer edge of said table, means to rotate said table step-by-step to align said fixture with said drill means, means to move said drill bit into and out of said radial opening to drill a recess in a screw in said fixture, plug inserting means adjacent the edge of said table and angularly spaced from said drill means, means to actuate said plug inserting means to insert a plug of resilient material through said radial opening into said recess, first air blast means between said drill means and said plug inserting means communicating with said inclined passage as said fixture is moved from said drilling means to said plug inserting means, and second air blast means spaced angularly from said plug inserting means for introducing air into said second passage to blow the screw out of said fixture after said plug has been inserted into said screw.

(References on following page)

References Cited in the file of this patent

UNITED STATES PATENTS

| | | |
|---|---|---|
| 1,448,969 | Knott et al. | Mar. 20, 1923 |
| 1,701,644 | Stull | Feb. 12, 1929 |
| 1,935,979 | Hubbard, Jr. | Nov. 21, 1933 |
| 2,361,091 | Edelmann et al. | Oct. 24, 1944 |
| 2,380,291 | Cameron | July 10, 1945 |
| 2,401,000 | Kucyn | May 28, 1946 |
| 2,520,121 | Brutus | Aug. 29, 1950 |

FOREIGN PATENTS

| | | |
|---|---|---|
| 585,045 | Great Britain | Jan. 29, 1947 |